US011553363B1

United States Patent
Chan et al.

(10) Patent No.: US 11,553,363 B1
(45) Date of Patent: Jan. 10, 2023

(54) SYSTEMS AND METHODS FOR ASSESSING VEHICLE DATA TRANSMISSION CAPABILITIES

(71) Applicant: State Farm Mutual Automobile Insurance Company, Bloomington, IL (US)

(72) Inventors: Aaron Scott Chan, San Jose, CA (US); Kenneth Jason Sanchez, San Francisco, CA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 131 days.

(21) Appl. No.: 16/688,804

(22) Filed: Nov. 19, 2019

Related U.S. Application Data

(60) Provisional application No. 62/775,176, filed on Dec. 4, 2018, provisional application No. 62/769,838, filed on Nov. 20, 2018.

(51) Int. Cl.
| | | |
|---|---|---|
| *G01R 31/08* | (2020.01) | |
| *G06F 11/00* | (2006.01) | |
| *G08C 15/00* | (2006.01) | |
| *H04J 1/16* | (2006.01) | |
| *H04J 3/14* | (2006.01) | |

(Continued)

(52) U.S. Cl.
CPC .......... *H04W 24/10* (2013.01); *G05D 1/0088* (2013.01); *G06Q 40/08* (2013.01); *G07C 5/008* (2013.01); *H04L 43/10* (2013.01)

(58) Field of Classification Search
CPC ......... H04W 24/10; H04W 4/21; H04W 4/44; H04W 4/46; H04W 4/026; G05D 1/0088; G05D 1/0287; G05D 2201/0213; G05D 1/0225; G05D 1/0285; G06Q 40/08; G06Q 10/1097; G06Q 30/0633; G07C 5/008; G07C 5/0808; G07C 5/0841; H04L 43/10;

(Continued)

(56) References Cited

U.S. PATENT DOCUMENTS 4,549,181 A * 10/1985 Tachibana ............. G01S 13/931
340/904
5,875,397 A * 2/1999 Sasin .................... H04W 24/00
455/423

(Continued)

FOREIGN PATENT DOCUMENTS

| JP | 2009237971 A | 10/2009 |
| JP | 2017062179 A | 3/2017 |
| WO | 2019043446 A1 | 3/2019 |

*Primary Examiner* — Stephen M D Agosta
(74) *Attorney, Agent, or Firm* — Armstrong Teasdale LLP

(57) ABSTRACT

A computer system for evaluating the communication performance of an autonomous vehicle is provided. The vehicle may have a vehicle controller including at least one processor in communication with at least one memory device. The processor may be programmed to receive, from a standard data transmission location network device, an evaluation data packet. The processor may be programmed to decode the evaluation data packet and initiate a diagnostic test of the vehicle based upon the decoded evaluation data packet. The processor may also be programmed to record measurements of the vehicle during the diagnostic test, and transmit the measurements to the standard data transmission location network device.

15 Claims, 12 Drawing Sheets

(51) Int. Cl.
*H04L 1/00* (2006.01)
*H04L 12/26* (2006.01)
*H04W 24/10* (2009.01)
*H04L 43/10* (2022.01)
*G05D 1/00* (2006.01)
*G07C 5/00* (2006.01)
*G06Q 40/08* (2012.01)

(58) Field of Classification Search
CPC .......... H01L 27/14678; H01L 27/3234; H04M 1/026; H04M 1/0266
See application file for complete search history.

(56) References Cited

U.S. PATENT DOCUMENTS

| | | | | |
|---|---|---|---|---|
| 6,035,053 | A * | 3/2000 | Yoshioka | G01S 13/42 |
| | | | | 382/104 |
| 6,223,125 | B1 * | 4/2001 | Hall | G08G 1/164 |
| | | | | 701/301 |
| 6,330,499 | B1 * | 12/2001 | Chou | G07C 5/008 |
| | | | | 701/31.4 |
| 9,336,436 | B1 * | 5/2016 | Dowdall | B60W 60/0027 |
| 9,559,973 | B1 * | 1/2017 | Aithal | H04L 47/29 |
| 9,575,161 | B1 * | 2/2017 | Haghighi | G01S 7/4052 |
| 9,606,539 | B1 * | 3/2017 | Kentley | G08G 1/005 |
| 9,805,423 | B1 | 10/2017 | Konrardy et al. | |
| 9,836,895 | B1 * | 12/2017 | Nygaard | G05D 1/0088 |
| 10,431,023 | B1 * | 10/2019 | Watson | G01M 17/007 |
| 10,466,717 | B1 | 11/2019 | Su et al. | |
| 10,471,967 | B2 | 11/2019 | Dai et al. | |
| 10,825,098 | B1 * | 11/2020 | Bueche, Jr. | G06Q 40/08 |
| 2004/0258279 | A1 * | 12/2004 | Hirvonen | G06V 20/64 |
| | | | | 382/104 |
| 2006/0122748 | A1 * | 6/2006 | Nou | G07C 5/0808 |
| | | | | 701/31.4 |
| 2006/0190148 | A1 * | 8/2006 | Grenn | G07C 5/006 |
| | | | | 701/29.2 |
| 2007/0108384 | A1 * | 5/2007 | Mueller | G01J 5/38 |
| | | | | 250/338.1 |
| 2007/0274227 | A1 | 11/2007 | Rauscher et al. | |
| 2008/0147316 | A1 * | 6/2008 | Okawa | G01C 21/00 |
| | | | | 701/96 |
| 2008/0189000 | A1 * | 8/2008 | Duong | B60T 7/22 |
| | | | | 701/20 |
| 2008/0243351 | A1 * | 10/2008 | Isogai | B60W 30/16 |
| | | | | 701/96 |
| 2009/0143987 | A1 * | 6/2009 | Bect | B60R 21/0134 |
| | | | | 701/301 |
| 2009/0325534 | A1 * | 12/2009 | Kennelly | H04W 24/06 |
| | | | | 455/403 |
| 2012/0330541 | A1 * | 12/2012 | Sakugawa | G08G 1/166 |
| | | | | 701/301 |
| 2013/0234880 | A1 * | 9/2013 | Lee | G01S 13/584 |
| | | | | 342/70 |
| 2014/0136414 | A1 * | 5/2014 | Abhyanker | G06Q 20/384 |
| | | | | 705/44 |
| 2014/0139369 | A1 * | 5/2014 | Baba | G01S 13/931 |
| | | | | 342/146 |
| 2014/0152488 | A1 * | 6/2014 | Baba | G01S 13/867 |
| | | | | 342/70 |
| 2014/0272811 | A1 * | 9/2014 | Palan | H04W 4/44 |
| | | | | 434/66 |
| 2016/0121791 | A1 * | 5/2016 | Shimizu | B60Q 1/525 |
| | | | | 340/435 |
| 2016/0358018 | A1 * | 12/2016 | Yoo | G06V 20/58 |
| 2017/0141873 | A1 * | 5/2017 | Mandeville-Clarke | |
| | | | | H04W 4/80 |
| 2017/0315551 | A1 | 11/2017 | Mimura et al. | |
| 2018/0002894 | A1 * | 1/2018 | Yamamoto | F02D 41/045 |
| 2018/0086351 | A1 * | 3/2018 | Zhu | B60W 30/16 |
| 2018/0088576 | A1 * | 3/2018 | Kong | B60W 50/06 |
| 2018/0130123 | A1 * | 5/2018 | Ross | G06Q 20/145 |
| 2018/0143632 | A1 * | 5/2018 | Zhu | B60W 10/18 |
| 2018/0176111 | A1 | 6/2018 | Lopes | |
| 2018/0237027 | A1 * | 8/2018 | Lundsgaard | B60W 30/16 |
| 2018/0281709 | A1 * | 10/2018 | Mendez | B60K 28/06 |
| 2018/0322711 | A1 * | 11/2018 | Weimerskirch | G07C 5/0808 |
| 2018/0375594 | A1 * | 12/2018 | Kildal | H04B 17/29 |
| 2019/0041853 | A1 | 2/2019 | Jain et al. | |
| 2019/0079659 | A1 | 3/2019 | Adenwala et al. | |
| 2019/0095872 | A1 | 3/2019 | Lalwani et al. | |
| 2019/0106117 | A1 * | 4/2019 | Goldberg | G05D 1/0214 |
| 2019/0108768 | A1 * | 4/2019 | Mohamed | G09B 9/04 |
| 2019/0129831 | A1 * | 5/2019 | Goldberg | G06F 3/04847 |
| 2019/0137287 | A1 | 5/2019 | Pazhayampallil et al. | |
| 2019/0383624 | A1 | 12/2019 | Magzimof et al. | |
| 2021/0108926 | A1 * | 4/2021 | Tran | G06T 17/05 |

\* cited by examiner

SYSTEMS AND METHODS FOR ASSESSING VEHICLE DATA TRANSMISSION CAPABILITIES

CROSS REFERENCE TO RELATED APPLICATIONS

This application claims the benefit of priority to U.S. Provisional Patent Application No. 62/769,838, filed on Nov. 20, 2018, entitled "SYSTEMS AND METHODS FOR SELECTING LOCATIONS TO VALIDATE AUTOMATED VEHICLE DATA TRANSMISSION" and to U.S. Provisional Patent Application No. 62/775,176, filed Dec. 4, 2018, entitled "SYSTEMS AND METHODS FOR ASSESSING VEHICLE DATA TRANSMISSION CAPABILITIES" the entire contents and disclosure of which are hereby incorporated by reference herein in their entirety.

FIELD OF THE INVENTION

The present disclosure relates to assessing autonomous vehicle performance, and more particularly, to network-based systems and methods for evaluating an autonomous vehicle's communication transmission and reception capabilities, and generating an assessment of the vehicle's operational safety and performance.

BACKGROUND

Autonomous and semi-autonomous vehicles may require significant sensor telemetry to quantify environmental/surrounding features for optimally efficient and safe vehicle navigation and operation. Vehicles equipped with onboard sensors, such as LIDAR and RADAR, may be able to detect obstacles and other features of the landscape. In addition, autonomous vehicles may receive sensor data from external sources such as satellite GPS data, which may be used to provide additional information such as positional data. Data from these sources may be combined with previously stored data and analyzed for autonomous vehicle operation. For example, in the case of GPS, location data may be overlaid on previously stored mapping data to determine routing plans. In other cases, real-time traffic information may be combined with previously designated route plans to determine alternate travel paths.

Use of multiple sources of information for autonomous vehicle operations may require transmitting and receiving large volumes of data. In addition, the processing power needed to analyze the data for navigation and vehicle control may be substantial. For optimal performance, significant bandwidth and low latency may be required. In some autonomous vehicle systems, communication with a centralized server may also be required. For example, individual vehicles acting as part of an autonomous vehicle network may coordinate with a central server by transferring their own telemetry and sensor data to the central server which may then determine optimal system routing. The central server may then transmit instructions to the vehicles. Autonomous vehicles or autonomous vehicle systems that suffer from interruptions in communication, or are unable to quickly process all of the data necessary for vehicle operation or navigation may have reduced performance or even suffer navigational or operational failure. Accordingly, there exists a need to evaluate data communication capabilities of autonomous and semi-autonomous vehicles to ensure that these vehicles are operating in a safe manner.

BRIEF SUMMARY

The present embodiments may relate to systems and methods for assessing the communication transmission and reception of an autonomous vehicle. The system may include a standard data transmission location ("SDTL") network device in a communication network, a receiver assembly on an autonomous vehicle, a transmitter assembly on the vehicle, and a vehicle controller in communication with the SDTL. The vehicle controller may be configured to: (i) receive an evaluation data packet ("EDP") from the SDTL network device; (ii) decode the EDP to determine what diagnostic test to perform; (iii) evaluate the communication performance of an autonomous vehicle by initiating the diagnostic test and detecting and measuring data communication results; (iv) generate a transformed evaluation data packet ("TEDP") based upon the EDP and the diagnostic test results; and/or (v) transmitting the TEDP to the SDTL network device.

In one aspect, a computer system for evaluating the communication performance of an autonomous vehicle may be provided. The vehicle may have a vehicle controller including at least one processor in communication with at least one memory device. The at least one processor may be programmed to receive, from a standard data transmission location (SDTL) network device, an evaluation data packet. The at least one processor may be programmed to decode the evaluation data packet and initiate a diagnostic test of the vehicle based upon the decoded evaluation data packet. The at least one processor may also be programmed to record measurements of the vehicle during the diagnostic test. The at least one processor may also be programmed to transmit the measurements to the SDTL network device. The computer system may also include additional, less, or alternate functionality, including that discussed elsewhere herein.

In another aspect, a computer-implemented method for evaluating the communication performance of an autonomous vehicle may be provided. The method may be implemented using a vehicle controller having at least one processor in communication with at least one memory. The method may include receiving, from a SDTL network device, an evaluation data packet. The method may further include decoding the evaluation data packet and initiating a diagnostic test of the vehicle based upon the decoded evaluation data packet. The method may further include recording measurements of the vehicle during the diagnostic test. The method may also include transmitting the measurements to the SDTL network device. The method may also include additional, less, or alternate functionality, including that discussed elsewhere herein.

In a further aspect, at least one non-transitory computer-readable storage media having computer-executable instructions embodied thereon may be provided. When executed by at least one processor, the computer-executable instructions may cause the at least one processor to: (i) receive, from a SDTL network device, an evaluation data packet; (ii) decode the evaluation data packet; (iii) initiate a diagnostic test of the vehicle based upon the decoded evaluation data packet; (iv) record measurements of the vehicle during the diagnostic test; and/or (v) transmit the measurements to the SDTL network device. The storage media may also include additional, less, or alternate functionality, including that discussed elsewhere herein.

In yet another aspect, a standard location network device for evaluating data transmission capabilities of an autonomous vehicle may be provided. The network device may include at least one processor in communication with at least one memory device, the at least one processor may be programmed to: (i) transmit, to the autonomous vehicle, an evaluation data packet configured to cause the autonomous vehicle to perform a diagnostic evaluation of the autonomous vehicle, wherein the evaluation data packet includes at least one type of diagnostic evaluation to perform; (ii) receive, from the autonomous vehicle, a transformed evaluation data packet including at least measurement data associated with the data transmission capability of the autonomous vehicle; (iii) record, a period of time between the transmitting of the evaluation data packet and the receiving of the transformed evaluation data packet; and/or (iii) analyze the transformed evaluation data packet to determine data transmission capability of the autonomous vehicle. The standard location network device may also include additional, less, or alternate functionality, including that discussed elsewhere herein.

In yet another aspect, a central server for evaluating data transmission capabilities of an autonomous vehicle may be provided. The central server may include at least one processor in communication with at least one memory device. The at least one processor may be programmed to: (i) receive, from the autonomous vehicle, a travel plan including at least a current location and a destination; (ii) retrieve, from a database, a plurality of standard data transmission location network devices including at least the location of each standard data transmission location network device; (iii) determine, based upon the current location of the autonomous vehicle and the received travel plan, at least one standard data transmission location network device to assign to the autonomous vehicle; and/or (iv) transmit, to the at least one standard data transmission location network device, computer-executable code instructing the at least one standard data transmission location network device to perform a data transmission capability evaluation. The central server may also include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
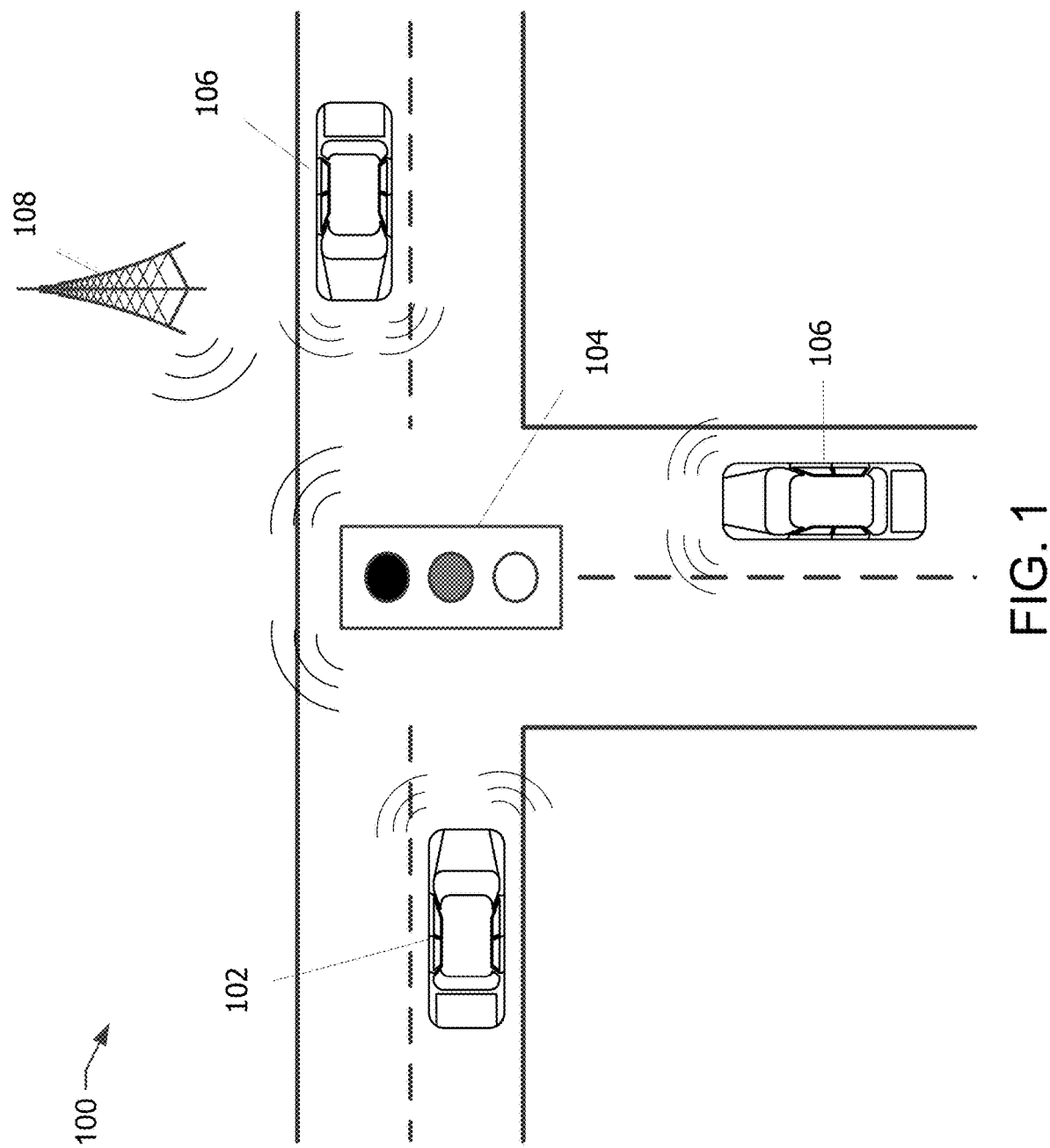
FIG. 1 illustrates a schematic diagram of an exemplary autonomous vehicle system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for assessing the communication performance of an autonomous or semi-autonomous vehicle (referred to herein as just autonomous vehicles or vehicles). Autonomous vehicles perform critical functions by communicating with external sources. Data received from external sources provide important navigational information. For example, satellite GPS data may help in mapping and routing vehicles. Other external sources may include, for example, traffic systems, other autonomous vehicles, and/or terrain or obstacle indicators. Assessing an autonomous vehicle's communication capabilities is therefore a primary step in autonomous vehicle operation.

Autonomous or semi-autonomous vehicles may pose a risk if the vehicle's data transmission capabilities are not transmitting and receiving data in an accurate and timely manner. If a vehicle is transmitting the wrong type of data and/or not receiving data from surrounding vehicles and infrastructure in a timely manner, the vehicle may not be able to efficiently communicate with nearby vehicles and respond quickly to avoid, for example, accidents. If the vehicle is receiving data in a timely manner but not transmitting a response, the vehicle may crash or cause an accident, and thus pose a risk the vehicle's occupants and those individuals in surrounding vehicles.

For example, the vehicle may receive command instructions from a central server to brake at an upcoming stop sign that is located in a busy intersection. In this example where the data is not being processed in a timely manner, the vehicle may receive the command instructions from the central server, but not relay the instructions to the vehicle's subsystems. In this example, the vehicle poses a risk to nearby vehicles if the vehicle runs the stop sign. Accordingly, if a vehicle is not able to receive, process, and transmit data in an accurate and timely manner, the vehicle may pose a significant risk to the overall vehicle network.

In the exemplary embodiment, the communication assessment process may be performed by a standard data transmission location ("SDTL") network device. In some embodiments the SDTL may be a roadside evaluation unit ("REU"). The SDTL may be a communication device capable of wireless communication (e.g. transmission and reception of information on the electromagnetic frequency spectrum). The SDTL may be affixed to and/or include a tower structure for wider coverage area (e.g. a structure with added height that reduces interference from obstructions between the SDTL and an autonomous vehicle). In some embodiments, the SDTL may be a temporary and/or permanent communication device in an airspace (e.g. communication airplane, balloon, etc.) and/or a satellite device in space.

The SDTL network device may be in communication with an onboard vehicle navigation and control system (referred to herein as just vehicle controller) of an autonomous vehicle. In some embodiments, the SDTL network device may also be in communication with third parties such as the vehicle owner, an automobile manufacturer, an insurance provider, a telecommunications service provider, a mechanic, and/or a government agency (e.g., the National Highway Traffic Safety Administration, departments of transportation, National Weather Service, National Oceanographic and Atmospheric Administration, etc.). In some embodiments, the SDTL may be in communication with a central server. The central server may in turn be in communication with the third parties. In some embodiments, the central server may be a vehicle data transmission diagnostics ("VDTD") server.

In the exemplary embodiment, the SDTL network device analyzes data received from one or more autonomous vehicles, and may determine an assessment of the communication performance of the vehicles assigned to the SDTL. In the exemplary embodiment, the SDTL may transmit evaluation or diagnostic tests in an evaluation data packet ("EDP") to the autonomous vehicles. In some embodiments, the EDP may be a data latency risk evaluation ("DLRE"). In some embodiments, the vehicle controller of an autonomous vehicle may perform a self-assessment of the communication capabilities of the autonomous vehicle and transmit the results to a central server or an SDTL network device. The SDTL may transmit the assessment to a third party (e.g., a manufacturer, mechanic, insurance provider, etc.) and/or transmit the assessment to a central server for additional analysis. In some embodiments, the central server may generate a risk assessment for the autonomous vehicle based upon the received assessment of the communication performance of the autonomous vehicle. The central server receiving such assessments may generate additional instructions (e.g., re-routing to a mechanic, temporary component overrides, shutdown commands, etc.) for the autonomous vehicle if the risk level exceeds a predetermined threshold.

In some embodiments, the SDTL network device may be in communication with one or more other SDTL network devices (e.g., other REUs) that may form a network of SDTL network devices. The network of SDTL network devices may encompass a larger geographical area than a single SDTL network device. Each SDTL in the network may be in communication with a central server.

In some embodiments, before an autonomous vehicle embarks on a trip, a route may be determined. The route may be defined by multiple waypoints at which the vehicle will pass through to reach its final destination. A network of SDTLs may be available for a geographic region that includes the route. In the SDTL network, multiple SDTL network devices may be available at different locations throughout the geographic region.

In some embodiments, a central server may be configured to identify SDTL network devices along the defined route. The central server may identify SDTLs near the various waypoints along the route. The central server (e.g., the VDTD server) may assess the data transmission capabilities, the real-time data traffic flow, and/or the reception ranges of the available SDTLs to determine which SDTL should serve as an evaluation checkpoint for the vehicle.

For example, the central server may monitor all SDTLs within Chicago. In this example, the central server may be in communication with each Chicago SDTL, and keep track of each data packet transmitted and received by the Chicago SDTLs. The central server may analyze each assessment of the communication performance of the vehicles for each SDTL to verify the performance of each SDTL. The central server may also assess factors, such as the destination and route of a particular vehicle for a given trip, to determine which Chicago SDTL to select. Additionally, the central server may consider the duration of the given trip, the destination (e.g., assess whether the vehicle is leaving Chicago and/or Illinois), the available SDTLs along the route, the reception ranges of each available SDTL, the data transmission capabilities of the vehicle, how long the central server expects it will take for an assessment to be performed and received from the vehicle, and/or the speed at which the vehicle will travel for the trip.

In the exemplary embodiment, the central server determines, based upon the route, an evaluation area. The evaluation process (e.g., the DLRE process) will occur within the evaluation area. The evaluation area may encompass at least a part of the route. In particular, the evaluation area may be a calculated area (e.g., based upon square mileage) that reflects optimal conditions for the evaluation process to occur for the vehicle based upon the trip data, and specifically, the selected route. The evaluation area may include a plurality of available SDTLs that are eligible to serve as the evaluation checkpoint.

In some embodiments, the evaluation area may include only one available SDTL. In these embodiments, the one available SDTL is selected by the central server to be the data latency evaluation checkpoint for the vehicle.

In embodiments where multiple eligible SDTLs are available within the evaluation area, the central server may randomly select one of the eligible SDTLs to serve as the data latency evaluation checkpoint. The central server may instruct the selected SDTL that the vehicle will be within the evaluation area at a specific time. The central server may instruct the selected SDTL to transmit a specific evaluation or diagnostic test to the vehicle at a specific location. For example, the central server may provide the selected SDTL with geographical coordinates as to the exact location at which the selected SDTL should transmit the test to the vehicle. In other embodiments, the selected SDTL may determine when and where to transmit the test to the vehicle once the vehicle is within the evaluation area.

In some embodiments, there may be a "handoff" from an SDTL selected to serve as the evaluation checkpoint to another eligible SDTL within the evaluation area. For example, an assigned SDTL may be overloaded by the time the vehicle is within the evaluation area. In this example, the assigned SDTL may be processing a high volume of evaluation data packets for multiple vehicles due to, for example, a traffic accident.

In other embodiments, there may be a "handoff" from a selected SDTL to another SDTL outside of the evaluation area. For example, an unforeseen accident or traffic jam along the route may affect the overall trip time and corresponding estimated time of arrival to a particular SDTL. In these embodiments, the vehicle may recalculate and embark on an alternate route (e.g., a faster route) to avoid, for example, sitting in traffic, and to reach the destination in a timely manner. In these embodiments, the vehicle may transmit the recalculated trip data to the central server, which in return, may determine a new evaluation area (based upon the recalculated trip data), and "handoff" the vehicle from the assigned SDTL to another SDTL along the new route. In some embodiments, an evaluation or diagnostic test may be in progress as the vehicle moves out of range of the SDTL that transmitted the test to the vehicle and a "handoff" to another SDTL to receive the test results may be determined.

At least one of the technical problems addressed by this system may include: (i) coordinating a system of autonomous vehicles using a network of command, control, and diagnostic communication devices; (ii) overcoming autonomous vehicle processing limitations and reducing the computational and processing burden on vehicles by partially shifting and/or fully offloading the processing of data to remote servers; (iii) identifying optimal network communication pathways for an autonomous vehicle; (iv) improving the safety of autonomous vehicles by performing periodic and/or continuous diagnostic testing and verification of the operation and performance of autonomous vehicles; and/or (v) identifying communication network and vehicle component faults and areas for improvement by conducting remote analysis of diagnostic evaluation results.

The methods and systems described herein may be implemented using computer programming or engineering techniques including computer software, firmware, hardware, or any combination or subset thereof, wherein the technical effects may be achieved by performing at least one of the following steps: (i) receiving, from a standard data transmission location network device, an evaluation data packet; (ii) decoding the evaluation data packet; (iii) initiating a diagnostic test; (iv) measuring the results of the diagnostic test; and (v) transmitting the results of the diagnostic test to the standard data transmission location network device.

Exemplary Autonomous Vehicle System

FIG. 1 illustrates a schematic diagram of an exemplary autonomous vehicle system 100. In the exemplary embodiment, vehicle system 100 is a highly automated network of vehicles. As shown in FIG. 1, vehicle system 100 includes a vehicle 102, a traffic light 104, and other vehicles 106. Vehicles 102 and 106 transmit vehicle telematics data (discussed below) to surrounding vehicles. Traffic light 104 may be equipped with traffic light sensors (not shown) that enable traffic light 104 to transmit and receive traffic data that includes, but is not limited to, data as to traffic signals, traffic signal cycle lengths, traffic control, pedestrian request signals, street lights, vehicle speeds, speed violations, traffic flow on roads controlled by traffic lights, intersection queue lengths, and vehicle accidents. The traffic light sensors may include, but are not limited to radar, LIDAR, Global Positioning System ("GPS"), video devices, imaging devices, cameras (e.g., 2D and 3D cameras), and audio recorders.

In vehicle system 100, vehicle 102 may receive data from vehicles 106 and traffic light 104. Thus, vehicle 102 continuously receives data as to its surrounding environment and its nearby vehicles, while simultaneously transmitting its own vehicle telematics data to vehicles 106 and traffic light 104. Accordingly, in vehicle system 100, vehicles, such as vehicles 102 and 106 may receive and process a greater volume and variety of data as opposed to those in vehicle networks that consist of mostly manually-operated vehicles. In some embodiments, vehicle system 100 may include a combination of manually-operated vehicles and autonomous and/or semi-autonomous vehicles.

In some embodiments, vehicle 102 may have sensors that, for example, may be used to visually detect the surrounding environment including, for example, traffic lights. Vehicle system 100 may also include a communication network 108. Communication network 108 may be a wireless network of communication towers. In some embodiments communication network 108 may be and/or may include satellite communication.

In the exemplary embodiment, communication network 108 may be a network of communication towers. In some embodiments, communication network 108 may be configured to transmit command and control signals to autonomous vehicles 102 and 106 for vehicle navigation and operation. In some embodiments, a separate communication network may be configured to transmit diagnostic, test, and/or systems evaluation data packets to autonomous vehicles 102 and 106. In the exemplary embodiment, communication network 108 includes at least one standard data transmission location ("SDTL") network device configured to at least transmit a standard evaluation data packet ("EDP") to autonomous vehicles 102 and 106.

Exemplary Standard Data Transmission Location Selection

Figure 2:
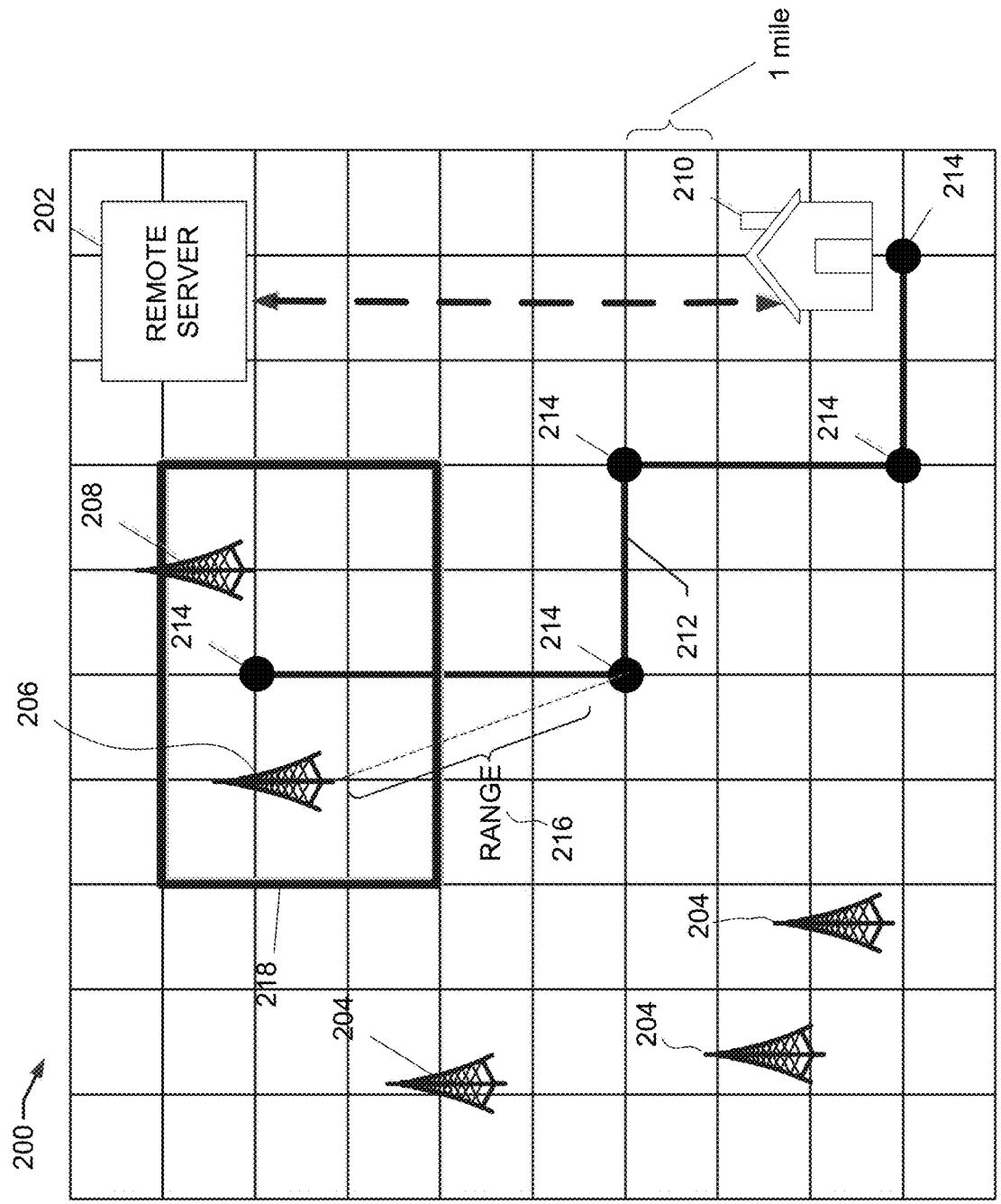
FIG. 2 illustrates a schematic diagram of an exemplary route for a vehicle shown in FIG. 1.

FIG. 2 illustrates a schematic diagram of an exemplary route 200 for a vehicle 102 shown in FIG. 1, in accordance with one aspect of the present disclosure. In the exemplary embodiment, determining route 200 is performed by a remote server 202. In some embodiments, remote server 202 may be a vehicle data transmission diagnostics server. Remote server 202 may be in communication with communication towers 204, 206, and 208. In the exemplary embodiment, communication towers 204, 206, and 208 are SDTL network devices. SDTL network devices 204, 206, and 208 may be configured for autonomous vehicle command and control transmissions.

In the exemplary embodiment, SDTL network devices 204, 206, and 208 are at least configured for diagnostic and/or data transmission evaluation transmission. In the exemplary embodiment, SDTL network devices 204, 206, and 208 may communicate with vehicle 102. SDTL network devices 204, 206, and 208 may form communication network 108 shown in FIG. 1.

Remote server 202 may communicate directly with a home base and/or a garage 210. Garage 210 may be in communication with vehicle 102. Remote server 202 may be configured to determine a path 212 (e.g., navigational route) for a planned journey. Remote server 202 determines waypoints 214 as part of the path. SDTL network devices 206 and 208 along path 212 may be identified for command and control purposes and/or for diagnostic and evaluation purposes. Diagnostic and evaluation procedures may be performed while vehicle 102 is traveling along path 212. SDTL network devices 204 may be out of range of path 212 and may not be selected for communication with vehicle 102 while SDTL network devices 206 and 208 that satisfy certain criteria or rules may be selected for communication with vehicle 102 during part of the journey. The criteria for selection of SDTL network devices 206 and 208 may be dependent on range 216.

In the example embodiment, remote server 202 randomly selects one of the two eligible SDTL network devices 206 and 208 to serve as the data latency checkpoint for vehicle 102. Accordingly, vehicle 102 is assigned to the selected SDTL network device 206.

In some embodiments, there may be only one SDTL network device 206 within an evaluation area 218 that is eligible to serve as a communication network device for vehicle 102 along path 212. In other embodiments, there may be multiple eligible SDTL network devices from which remote server 202 may choose as the communication network device along path 212. In these embodiments, remote server 202 may randomly select one of the eligible SDTLs to serve as the communication network device.

In some embodiments, there may be a "handoff" from an assigned SDTL to another eligible SDTL. For example, assigned SDTL network device 206 may be overloaded by the time vehicle 102 is within evaluation area 218. In this example, assigned SDTL network device 206 may be processing a high volume of test data packets for multiple vehicles due to, for example, a traffic accident.

In another example, an unforeseen accident or congestion along path 212 may affect the trip time and corresponding estimated time of arrival. In these embodiments, vehicle 102 may recalculate and embark on a different route to avoid for example, idling in traffic, and reach the destination in a timely manner. In these embodiments, vehicle 102 may transmit the recalculated trip data to SDTL network device 208 which in return, may "handoff" vehicle 102 from the assigned SDTL network device 206 to new SDTL network device 208 along the new route.

Exemplary Evaluation Reception

Figure 3:
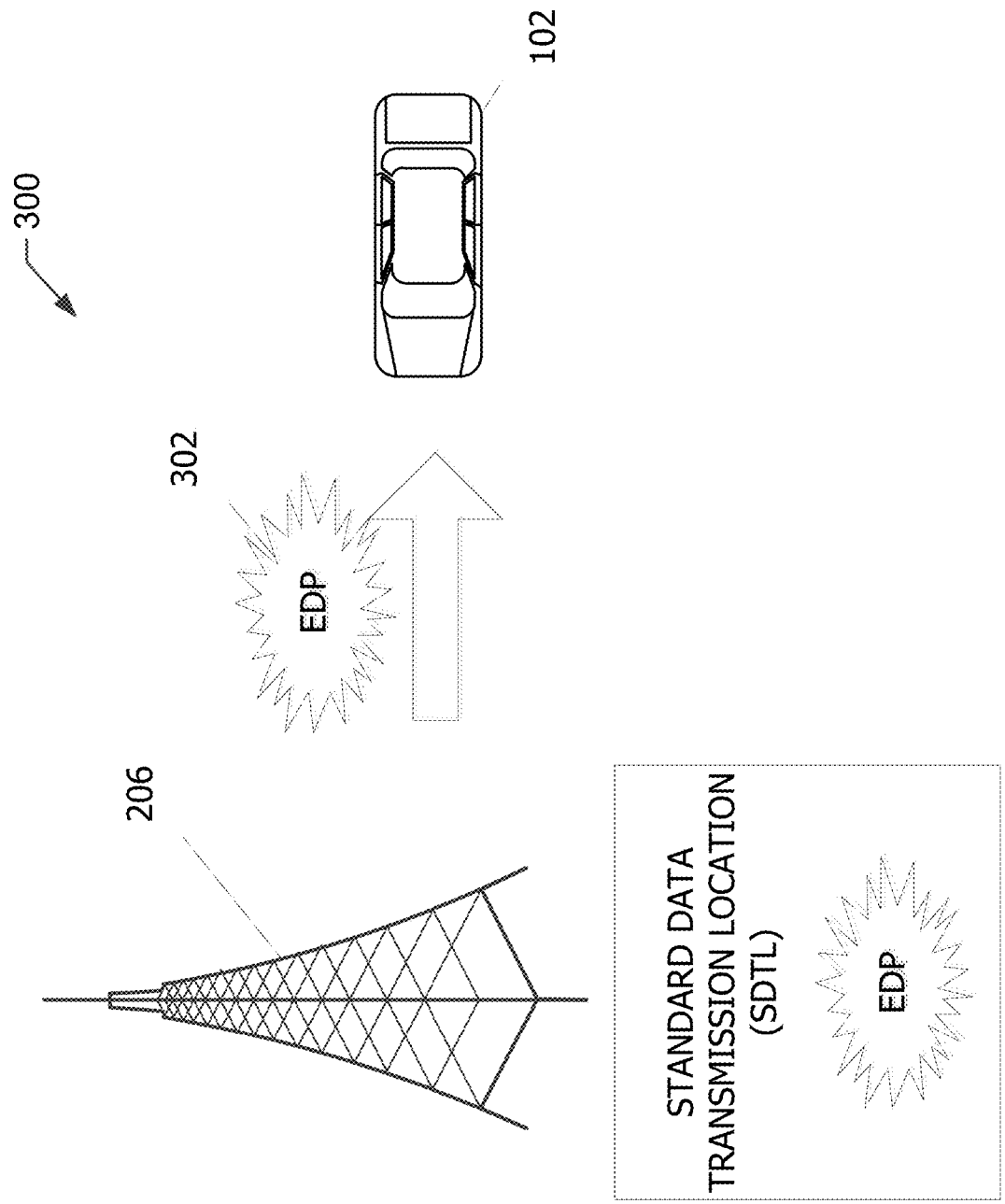
FIG. 3 illustrates a data flow of an exemplary data transmission process that includes transmitting an evaluation data packet to a vehicle shown in FIG. 1.

FIG. 3 illustrates a data flow of an exemplary data transmission process for an evaluation data packet ("EDP") 302 to a vehicle shown in FIG. 1, in accordance with one aspect of the present disclosure. In the exemplary embodiment, EDP 302 is a collection of information configured for autonomous vehicle testing and is transmitted to vehicle 102 via communication network 108. For example, EDP 302 may include instructions (e.g., computer-executable code) to vehicle 102 on what diagnostic tests to execute. In some embodiments, EDP 302 may include a simulation model for execution. EDP 302 may also include a payload for simulation. The payload may include, for example, a scenario, a simulation model, simulation parameters (e.g., obstacles, timing of events, etc.).

In the exemplary embodiment, EDP 302 may be generated by SDTL network device 206. In some embodiments, a remote server generates EDP 302 and transmits EDP 302 directly to vehicle 102. Alternatively, EDP 302 is transmitted by the remote server to vehicle 102 via a network such as communication network 108. In some embodiments, vehicle 102 performs a self-diagnostic from a default EDP 302 stored in a memory on vehicle 102. Alternatively, EDP 302 may have been received and stored in vehicle 102 previously. For example, a default EDP 302 may be stored in a non-volatile or read-only memory location. In cases where SDTL network device 108 is unavailable, the default EDP 302 may be retrieved from the stored memory for use.

In the exemplary embodiment, EDP 302 includes instructions for performing a self-diagnostic. The self-diagnostic may include instructions to perform steps to evaluate components of vehicle 102 necessary for vehicle operation (e.g., engine, drivetrain, steering, communications, lighting, etc.). In the exemplary embodiment, EDP 302 includes instructions to perform a test of the communication systems. EDP 302 may also include test data that may be used to perform testing of the communications systems.

For example, EDP 302 may include instructions to test a receiver assembly. The test data may be transmitted to the receiver assembly. The test data may then be measured (including does the vehicle process the test data correctly, and does it process it in a timely manner) after reception by the receiver assembly.

In some embodiments, EDP 302 includes instructions and test data for simulation of different scenarios. For example, EDP 302 may include instructions to simulate an obstacle (e.g., other vehicles, pedestrians, etc.) and evaluate the response by vehicle 102.

Exemplary Autonomous Vehicle

Figure 4:
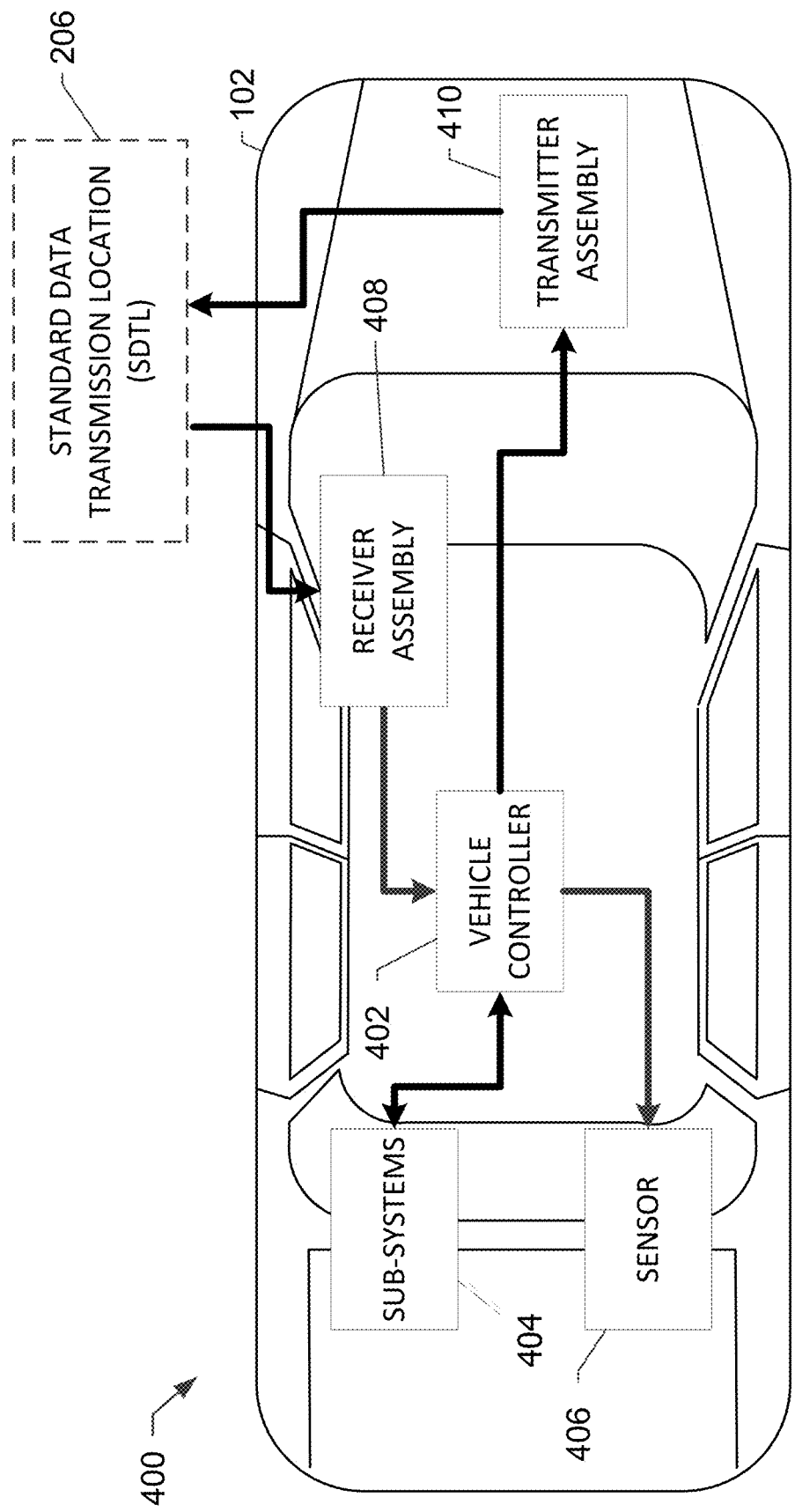
FIG. 4 illustrates a schematic diagram of the exemplary autonomous vehicle shown in FIG. 3 having an onboard vehicle navigation and control system (OVNCS).

FIG. 4 illustrates a schematic diagram of the exemplary autonomous vehicle 102 shown in FIG. 3 having an onboard vehicle navigation and control system, or just "vehicle controller" 400. In the exemplary embodiment, the vehicle controller 400 includes a vehicle controller 402. Vehicle controller 402 may be configured to control sub-systems 404 that may be configured to control vehicle 102. Sub-systems 404 may include vehicle navigation and control such as engine control (e.g., piston monitoring, cam shaft rotation, stroke timing, fuel injection systems, steering, braking, suspension and ride height and stiffness, safety systems, etc.). In some embodiments, sub-systems 404 may include systems directed to steering/suspension, cooling, braking, axle/differential, engine performance, automatic transmission, drivetrain and axles, electrical/electronic systems, and climate control (e.g., heating and air conditioning). Sub-systems 404 may have corresponding electronic control units that react, based upon signals received from vehicle controller 400, in a timely manner to operate vehicle 102.

Vehicle controller 400 may also include at least one sensor 406. Sensor 406 may be in communication with vehicle controller 402 and may be configured to transmit sensor data to vehicle controller 402. In some embodiments, sensor 406 may be a part of and/or may be in communication directly with sub-systems 404. Sensor 406 may be any type of sensor use in a vehicle such as, but not limited to, LiDAR, RADAR, video cameras, audio sensors (e.g., microphones), weight detectors, accelerometers, gyroscopic, proximity, motion detectors, infrared. Sensor 406 may be configured to detect external environmental conditions. Alternatively, and/or additionally, sensor 406 may be configured to detect internal conditions of vehicle 102 (e.g., vehicle movement, engine temperature, cabin occupants, etc.).

In the exemplary embodiment, sensor 406 may be configured to monitor vehicle 102. Conditions of vehicle 102 detected by the plurality of sensors 406 may include various types of telematics data, such as speed, acceleration, deceleration, heading, direction, location, gear, braking, cornering, vehicle operation, and other conditions related to the operation of vehicle 102, for example: at least one of a measurement of at least one of speed, direction rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. The telematics data may also include a tread depth of one or more vehicle tires, an environmental sensor reading (e.g., temperature, humidity, acceleration), vehicle mileage, vehicle oil and fluid levels, tire pressure, tire temperature, vehicle brake pad thicknesses, gyroscope and accelerometer sensor information, GPS information, and the like.

Vehicle controller 400 may also include a receiver assembly 408. Receiver assembly 408 may be configured to receive data from external sources from, for example, SDTL 108. Receiver assembly 408 may transmit received data to vehicle controller 402. Vehicle controller 400 may also include a transmitter assembly 410. Transmitter assembly 410 may be configured to transmit data to external sources such as SDTL 108. Transmitter assembly 410 may receive data for transmission from vehicle controller 402. In some embodiments, vehicle 102 may receive data directly from a remote server such as remote server 202 shown in FIG. 2.

In the exemplary embodiment, vehicle controller 402 may be configured to process evaluation data packets received from SDTL 108. In some embodiments, vehicle controller 402 may be configured to instruct sub-systems 404 based upon instructions received in EDP 302. In these embodiments, vehicle controller 402 may collect evaluation data from sub-systems 404 (e.g., response times from each sub-system in executing instructions), generate a response data packet, and transmit the generated packet to SDTL 108. In further embodiments, vehicle controller 402 may process and interpret sensory information received from sensor 406.

In some embodiments, vehicle controller 402 may include a display screen or touchscreen (not shown) that is capable of receiving user input, such as, for example, trip data (e.g., trip destination), from the driver. In other embodiments, vehicle controller 402 may be capable of wirelessly communicating with a user computer device such as a mobile device (not shown) in vehicle 102. In these embodiments, vehicle controller 402 may be capable of communicating with the user of the mobile device, such as the driver, through an application of the mobile device.

In some embodiments, vehicle 102 may include autonomous or semi-autonomous vehicle-related functionality or technology that may be used with the present embodiments to replace human driver actions and may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with host vehicle controller 402.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems.

While vehicle 102 may be an automobile in the exemplary embodiment, in other embodiments, vehicle 102 may be, but is not limited to, other types of ground craft, aircraft, and watercraft vehicles.

Exemplary Process for Diagnostic Transformation

Figure 5:
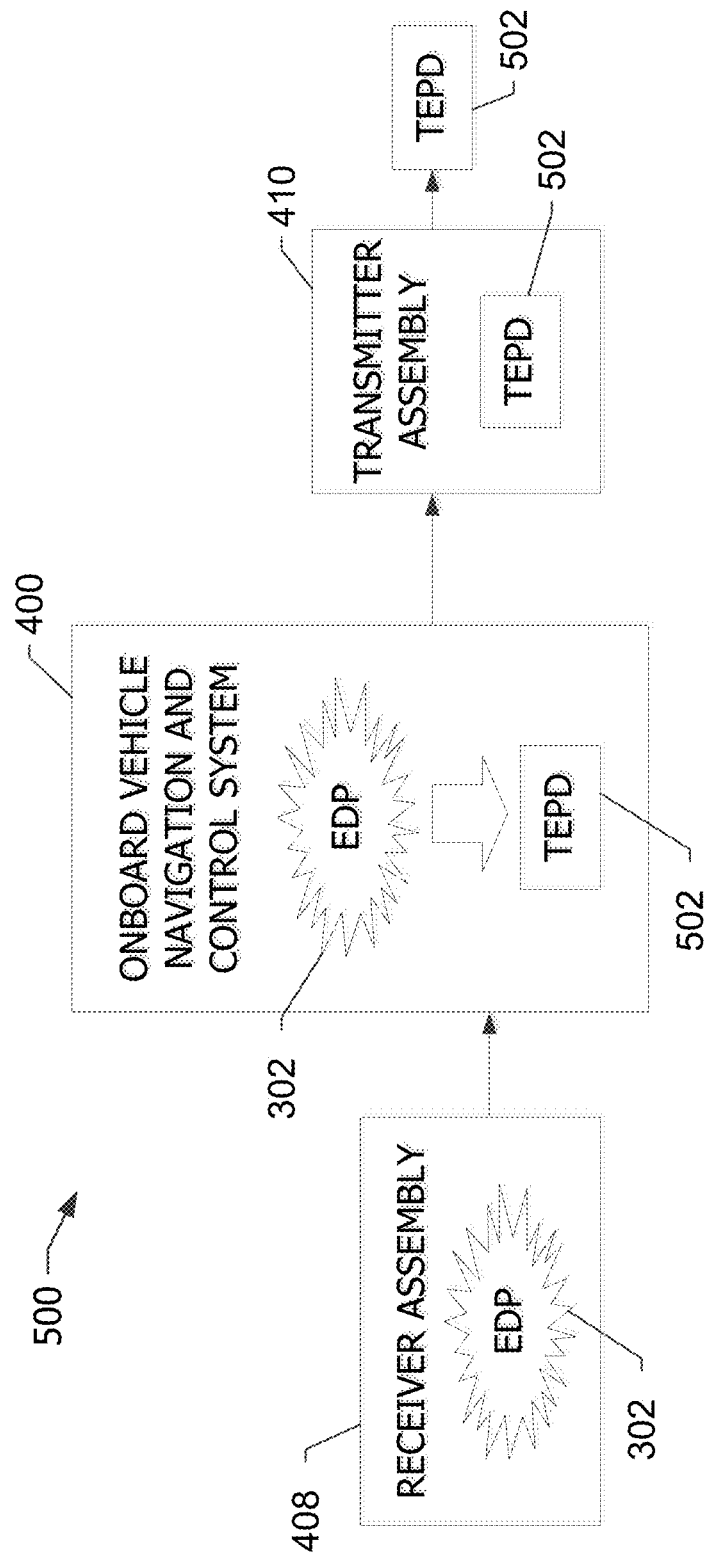
FIG. 5 illustrates a data flow diagram for the transformation of an evaluation data packet ("EDP") to a transformed evaluation data packet ("TEDP") by the OVNCS shown in FIG. 4.

FIG. 5 illustrates a data flow diagram for the transformation of EDP 302 to a transformed evaluation data packet ("TEDP") 502 by vehicle controller 400, in accordance with one aspect of the present disclosure. In the exemplary embodiment, receiver assembly 408 of vehicle 102 (shown in FIG. 1) receives EDP 302. Receiver assembly 408 transmits EDP 302 to vehicle controller 400. Vehicle controller 400 transforms EDP 302 into TEDP 502. Vehicle controller 400 then transmits TEDP 502 to transmitter assembly 410. Transmitter assembly 410 transmits TEDP 502 to an external source such as SDTL 108.

In the exemplary embodiment, EDP 302 is transformed into TEDP 502 through the evaluation process. The evaluation process may include a mathematical calculation or sets of sample calculations by sub-systems and/or electronic components of vehicle 102. The mathematical calculations may, for example, be estimations or summations of response times for commands issued by vehicle controller 400. In some embodiments, the calculations may include estimates of at least one of bits per second, bandwidth frequency, and latency.

In the exemplary embodiment, the evaluation process may include evaluation of transmission and reception capabilities including signal strength evaluation, detection of errors in data, accuracy assessments, and verification of proper and accurate outputs including proper functioning of the vehicle or vehicle sub-systems. In some embodiments, the evaluations may include analyzing response times of sub-systems. For example, a steering command issued may have a measurable response time before the steering system is able to complete execution of the command. In some embodiments, sub-systems may be in communication with other components and/or other sub-systems. Evaluation of communication times between sub-systems may be included in the evaluation process.

In some embodiments, the communication analysis may further include degradation of transmission and reception signals, error detection, and/or signal processing and/or transformation and performance analysis. In some embodiments, the evaluation process may include generating a model of the components and/or modules of vehicle 102. The model may then be used for statistical analysis and/or generating predictive patterns for performance.

In the exemplary embodiment, the evaluation process includes the combination of response times between reception of EDP 302, decoding of EDP 302, execution of diagnostic tests including activation of identified sub-systems and the response of the sub-systems, compilation of results, combining and/or transforming of EDP 302 with results to form TEDP 502, and transmitting of TEDP to SDTL network device 206.

In some embodiments, a stored EDP 302 may be retrieved from memory to initiate a diagnostic test. The stored EDP 302 may be a previously received EDP 302. In some embodiments, EDP 302 may be stored by a manufacturer or other third party. In some embodiments, EDP 302 may be a default EDP 302.

In some embodiments, EDP 302 may be retrieved upon startup of the system. For example, when passengers board vehicle 102, vehicle controller 400 may perform a standard check of the systems. In some embodiments, EDP 302 may be periodically retrieved from memory and the diagnostic test may be executed during a single trip. In some embodiments, diagnostic testing may be performed continuously over the course of a trip. In some embodiments, diagnostic testing may be randomly performed. EDP 302 may define the timing, location, and/or use other factors to determine when a particular diagnostic test is to be performed.

In some embodiments, the evaluation process may include communication with other, external systems such as other vehicles, traffic systems, weather information systems, and/or other emergency alert systems. In some embodiments, the evaluation process includes a simulation or generation of virtual obstacles and determination of response times to the virtual obstacles or simulated scenarios. For example, a virtual pedestrian engaging in a sudden movement interrupting a pre-determined or previously computed navigational path may be generated. A simulation of the movement of the virtual pedestrian may be executed to determine a sample set of response by control systems of vehicle 102.

In some embodiments, nearby external systems may be used to perform the evaluation process. For example, traffic systems and/or other vehicles may be configured to transmit test signals as part of the evaluation process.

Exemplary Vehicle Control System

Figure 6:
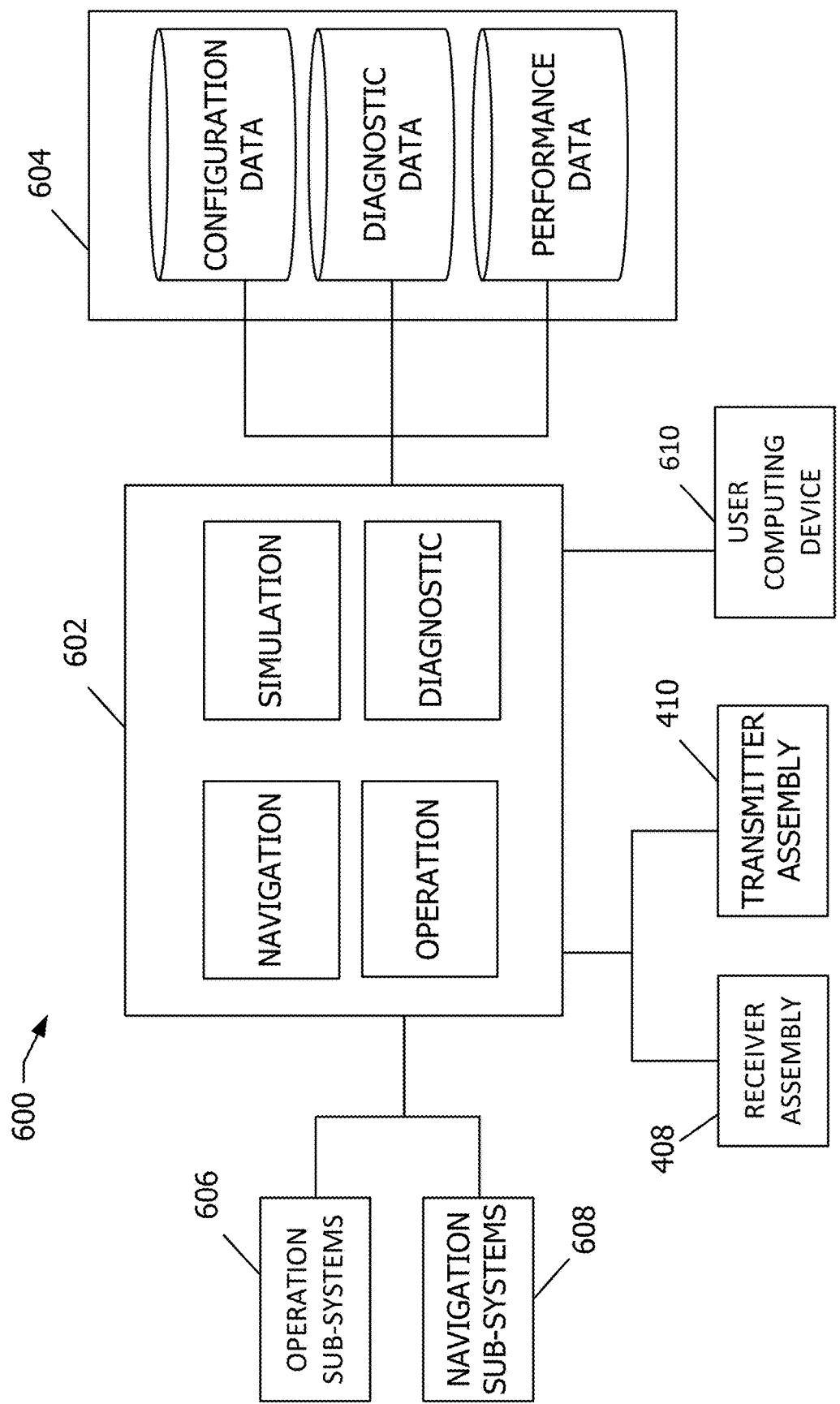
FIG. 6 illustrates a schematic diagram of the OVNCS shown in FIG. 4.

FIG. 6 illustrates a schematic diagram 600 of vehicle controller 400 shown in FIG. 4, in accordance with one aspect of the present disclosure. Vehicle controller 400 may include a vehicle control processor 602. Vehicle control processor 602 may be a computer processor configured to receive, process, and transmit data generated by vehicle 102 shown in FIG. 4.

Vehicle control processor 602 may be configured to operate in multiple modes (e.g., vehicle operation, diagnostic and testing, simulation). Vehicle control processor 602 may include one or more processing units (e.g., in a multi-core configuration). In some embodiments, vehicle control processor 602 may be in other configurations as described below. In the exemplary embodiment, vehicle control processor 602 may be in communication with a memory area 604. In some embodiments, executable instructions may be stored in a memory area 604. Memory area 604 may be any device allowing information such as executable instructions and/or transaction data to be stored and retrieved. Memory area 604 may include one or more computer-readable media. Memory area 604 may include at least one database.

In the exemplary embodiment, memory area 604 may include a configuration database having an arrangement of data interlinking and/or relating the configuration of components (e.g., sub-systems) of vehicle 102. Memory area 604 may also include a diagnostic database storing different diagnostic evaluations to perform, a default diagnostic evaluation or examination, and/or vehicle performance models and/or benchmarks. Memory area 604 may also include a performance database storing a history of evaluation results and/or continuously monitored metrics for vehicle 102.

Vehicle control processor 602 may be in communication with operation sub-systems 606. Mechanical sub-systems 606 may include actuators, steering control, environmental monitoring (e.g., cabin temperature, air quality, weather sensors, etc.), electronic systems (e.g., power systems, lighting, etc.), suspension systems, transmission systems, other mechanical components necessary for vehicle operation, communication systems, and/or sensor systems. Vehicle control processor 602 may also be in navigation sub-systems 608. Navigation sub-systems may include mapping data, GPS reception, sensors for landscape and obstacle detection, communication systems for receiving real-time updates, processors for identification, analysis, and modeling of environmental and landscape features, and other guidance systems.

In the exemplary embodiment, vehicle controller 400 receives EDP 302 via receiver assembly 408. EDP 302 is transmitted to processor 602. Processor 602 decodes and/or analyzes EDP 302 to determine the type of evaluation to perform. In the exemplary embodiment, EDP 302 includes instructions (e.g., computer-executable code) to perform a communication analysis including, but not limited to, an evaluation of data transmission bandwidth and data transmission latency.

Exemplary User Computer Device

Figure 7:
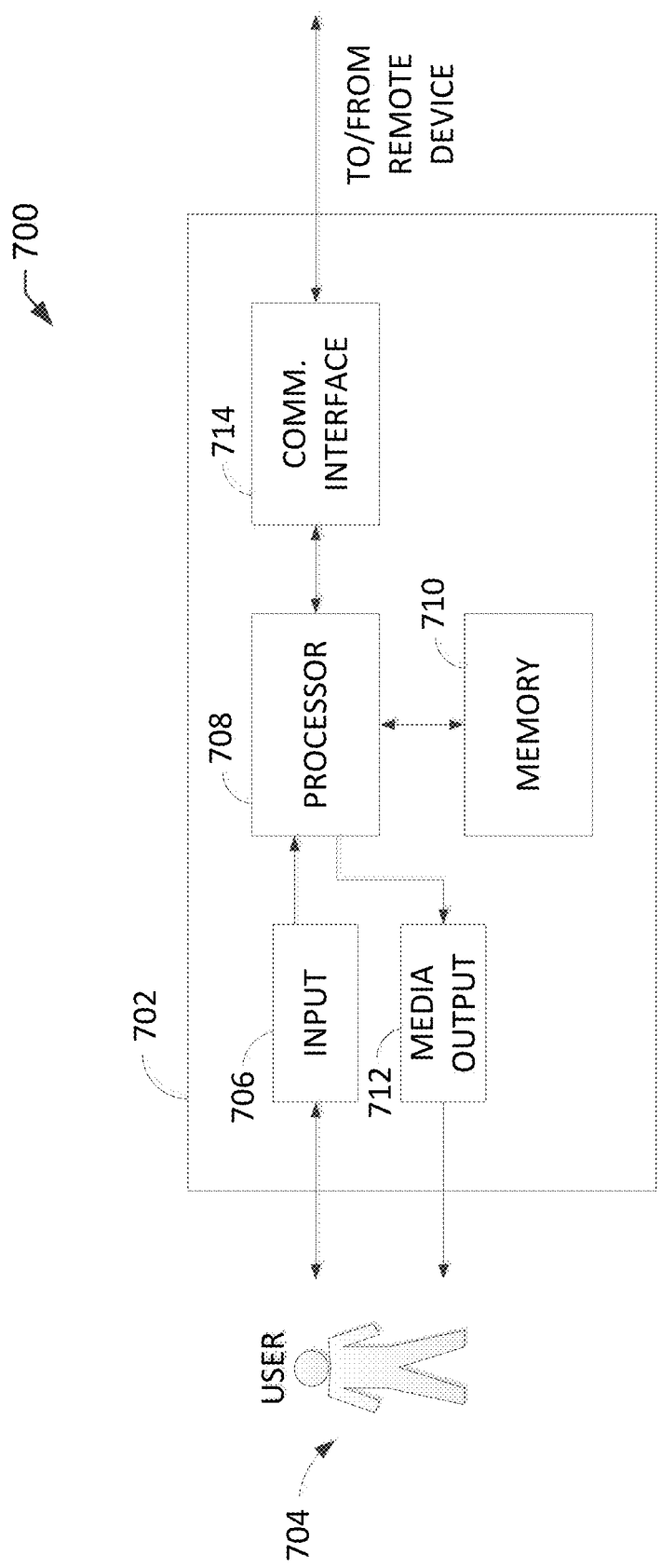
FIG. 7 illustrates an exemplary configuration of an exemplary user computing device shown in FIG. 6.

FIG. 7 illustrates an exemplary configuration 700 of an exemplary user computing device 702. In some embodiments, user computing device 702 may be user computing device 424 (shown in FIG. 4).

In some embodiments, vehicle controller 400 may include a user computer device 702 operated by users of vehicle 102. User computer device 702 may receive input from a user 704 via an input module 706. User computer device 702 may be in communication with vehicle controller 400 and may include a processor 708 for executing instructions. In some embodiments, executable instructions may be stored in a memory area 710. Processor 708 may include one or more processing units (e.g., in a multi-core configuration). Memory area 710 may be any device allowing information such as executable instructions and/or transaction data to be stored and retrieved. Memory area 710 may include one or more computer-readable media. Users of vehicle 102 may be passengers, owners, licensed and/or authorized pilots, mechanics, maintenance personnel, government officials, and/or manufacturers.

User computer device 702 may include at least one media output component 712 for presenting information to users. Media output component 712 may be any component capable of conveying information to user 704. In some embodiments, media output component 712 may include an output adapter (not shown), such as a video adapter and/or an audio adapter. An output adapter may be operatively coupled to processor 708 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 712 may be configured to present a graphical user interface (e.g., a web browser and/or a client application) to user 704. A graphical user interface may be configured to display, for example, routing information, diagnostic information, vehicle performance information (e.g., energy levels, maintenance information, etc.), communication information (e.g., signal strength, bandwidth, latency, etc.).

In some embodiments, user computer device 702 may include an input device for receiving input from user 704. User 704 may use input devices to, without limitation, interact with vehicle 102 (shown in FIG. 4), SDTL 108, or remote server (shown in FIG. 2). Input devices may include, for example, a keyboard, a pointing device, a mouse, a stylus, and/or a touch sensitive panel (e.g., a touch pad or a touch screen). A single component, such as a touch screen, may function as both an output device of media output component 712 and an input device. User computer device 704 further may include at least one sensor, including, for example, a gyroscope, an accelerometer, a position detector, a biometric input device, a telematics data collection device, and/or an audio input device.

Stored in memory area 710 may be, for example, computer-readable instructions for providing a user interface to user 704 via media output component 712 and, optionally, receiving and processing input from an input device using input module 706. The user interface may include, among other possibilities, a web browser and/or a client application. Web browsers enable users, such as user 704, to display and interact with media and other information typically embedded on a web page or a website hosted by a service provider and/or user computer device 702. For example, instructions may be stored by a cloud service and the output of the execution of the instructions sent to the media output component 712.

Exemplary Data Structure

Figure 8:
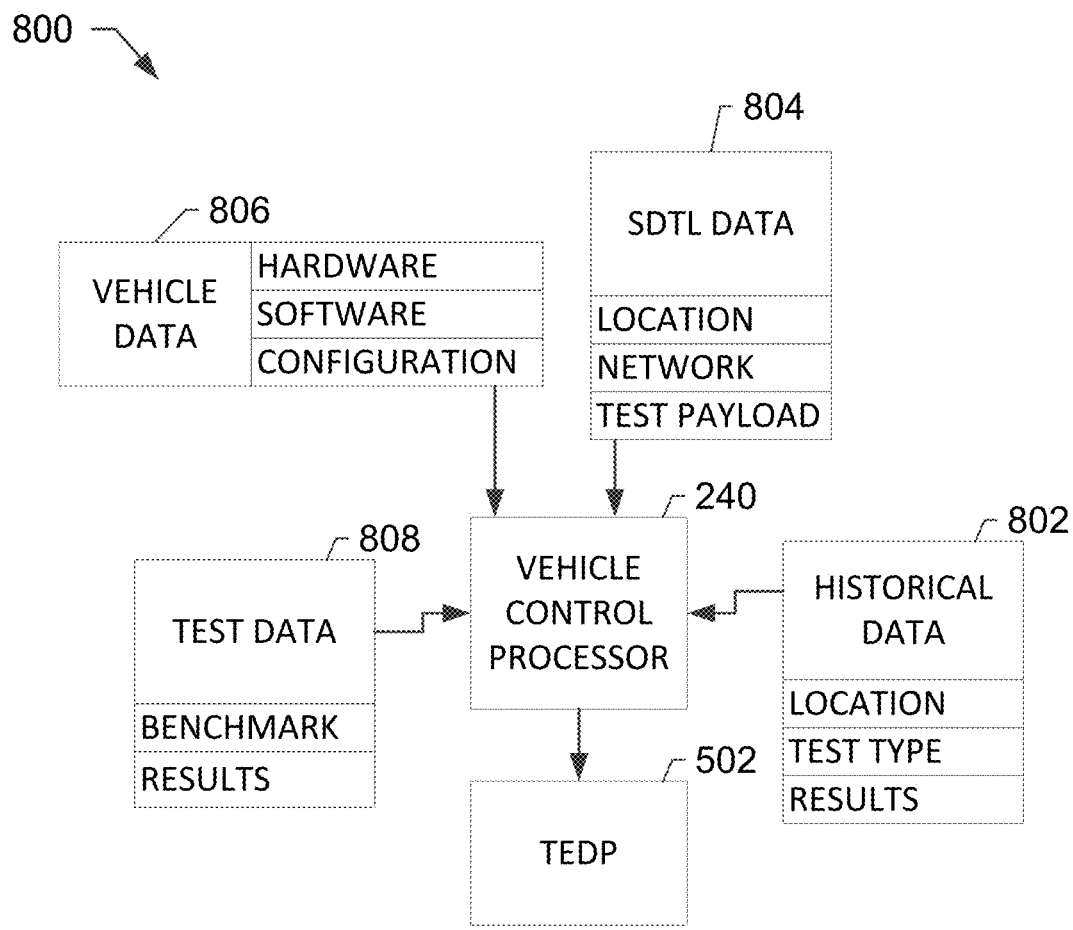
FIG. 8 illustrates an exemplary data structure for the TEDP shown in FIG. 4.

FIG. 8 illustrates an exemplary data structure 800 for a transformed evaluation data packet ("TEDP") 502. TEDP may be generated by vehicle control processor 240. Vehicle control processor 240 may retrieve historical data 802. Historical data 802 may include a plurality of previous data transformations. Each data transformation may be for a single diagnostic or evaluation, each data transmission evaluation conducted at a particular location. Historical data 802 may include a specific test type.

In the exemplary embodiment, vehicle control processor 240 retrieves historical data 802 based upon test type. In the exemplary embodiment, vehicle control processor 240 retrieves historical data 802 associated with data transmission evaluations. In some embodiments, vehicle control processor 240 retrieves historical data 802 for a specified period of time (e.g., past week, past 6 months, past year, etc.).

In the exemplary embodiment, vehicle control processor 240 receives SDTL data 804. SDTL data 804 may be received from SDTL network device 206 (shown in FIG. 2). SDTL data 804 may include location information of SDTL network device 206, information related to the network (e.g., bandwidth, transmission capabilities, traffic and/or congestion, etc.), and diagnostic testing payload (e.g., test instructions, simulation data, etc.). Vehicle control processor 240 may also retrieve vehicle data 806 including hardware, software, and configuration and/or version information for vehicle 102. Vehicle control processor 240 may generate test data 808 including provided benchmarks and test data results.

In the exemplary embodiment, vehicle control processor 240 analyzes at least the above described data sets to generate TEDP 502. TEDP 502 may be arranged such that anomalous conditions are accessible separately from other diagnostic information. In some embodiments, TEDP 502 includes use of unique identifiers or keys to identify the specific vehicle. In some embodiments, the unique identifiers or keys may be the SDTL network device 206 in which vehicle 102 is in communication with.

Exemplary Evaluation Transmission

Figure 9:
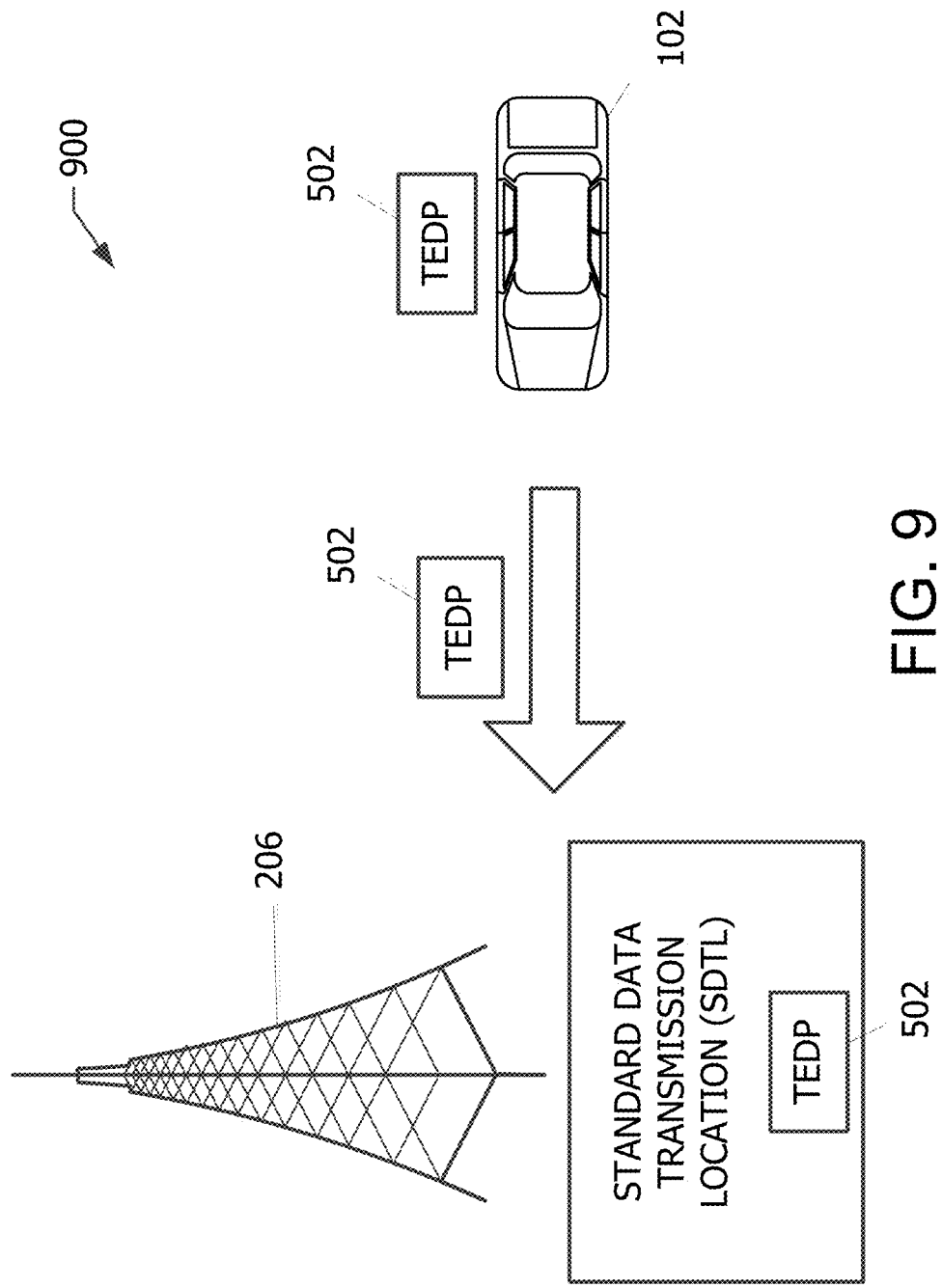
FIG. 9 illustrates an exemplary data flow diagram for the transmission of the EDP shown in FIG. 5.

FIG. 9 illustrates an exemplary data flow diagram for the transmission of TEDP 502. In the exemplary embodiment, TEDP 502 is transmitted from vehicle 102 to SDTL network device 206. Vehicle 102 may use transmitter assembly 410 (shown in FIG. 4) to transmit TEDP 502. In the exemplary embodiment, SDTL network device 206 may be a known network device previously assigned to vehicle 102 for communication. Vehicle 102 may have previously received EDP 302 (shown in FIG. 3) from SDTL network device 206. In some embodiments, vehicle 102 may have moved out of range of the originating network device. SDTL network device 206 may therefore be a second network device in communication network 18 (shown in FIG. 1). In some embodiments, vehicle 102 may transmit TEDP 502 to a remote server such as remote server 202.

Transmission of TEDP 502 may include a transformation process. For example, TEDP 502 may be embedded on a transmission signal using a Fourier, Laplace, z-transform, or other transformation process. In some embodiments, EDP 302 may be combined with evaluation results prior to the transformation process to create a TEDP 502 signal for transmission.

Exemplary Vehicle System

Figure 10:
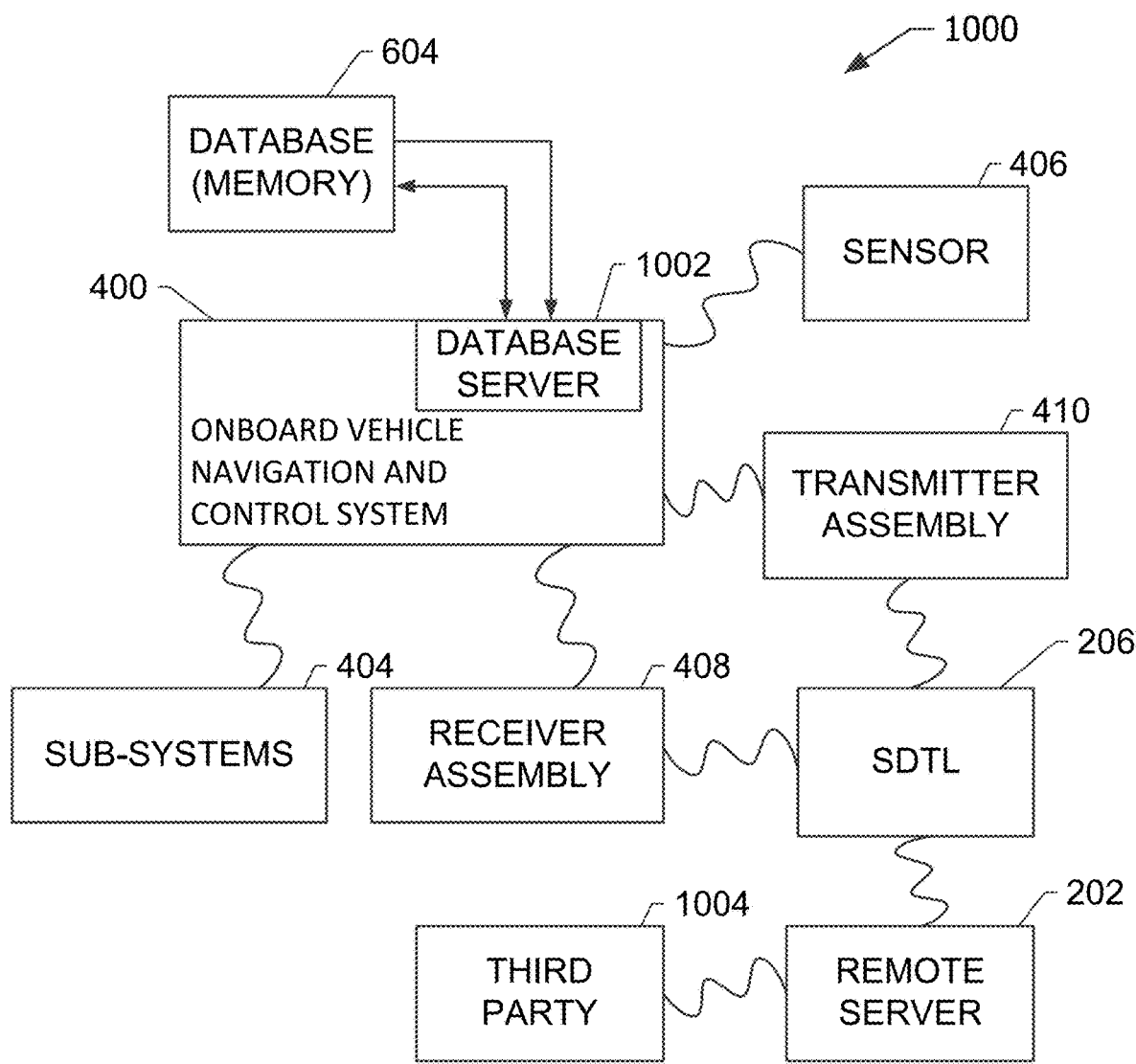
FIG. 10 is a simplified block diagram of the OVNCS shown in FIG. 2.

FIG. 10 is a simplified block diagram 1000 of vehicle controller 400 shown in FIG. 4. Vehicle controller 400 may include a database server 1002 in communication with memory area 604. Vehicle controller 400 may also be in communication with sub-systems 404, sensor 406, receiver assembly 408, and transmitter assembly 410. Receiver assembly 408 and transmitter assembly 410 may be in communication with SDTL network device 206. SDTL network device 206 may be in communication with remote server 202. Remote server 202 may be in communication with a third party 1004. Third party 1004 may be a manufacturer, mechanic, insurance provider, owner, and/or autonomous vehicle system administrator.

In some embodiments, third party 1004 may be an insurance provider. Remote server 202 may be configured to transmit evaluation records to third party 1004. Computer devices of not only third party 1004 but also vehicle manufacturers (not shown) may utilize the received evaluation records to update and/or adjust, for example, an insurance policy of an insurance policy holder.

In some embodiments, evaluation records may be used to update and/or create an financial or insurance underwriting model and/or an actuarial model to determine whether different types of risk are dependent on a driver, the vehicle control system, software updates, different types of data received by the vehicle, the volume of data received by the vehicle, and/or system failures in a geographic location (e.g., problems with a network of SDTLs in a given geographic location).

Exemplary Process for Analyzing Communication Capabilities

Figure 11:
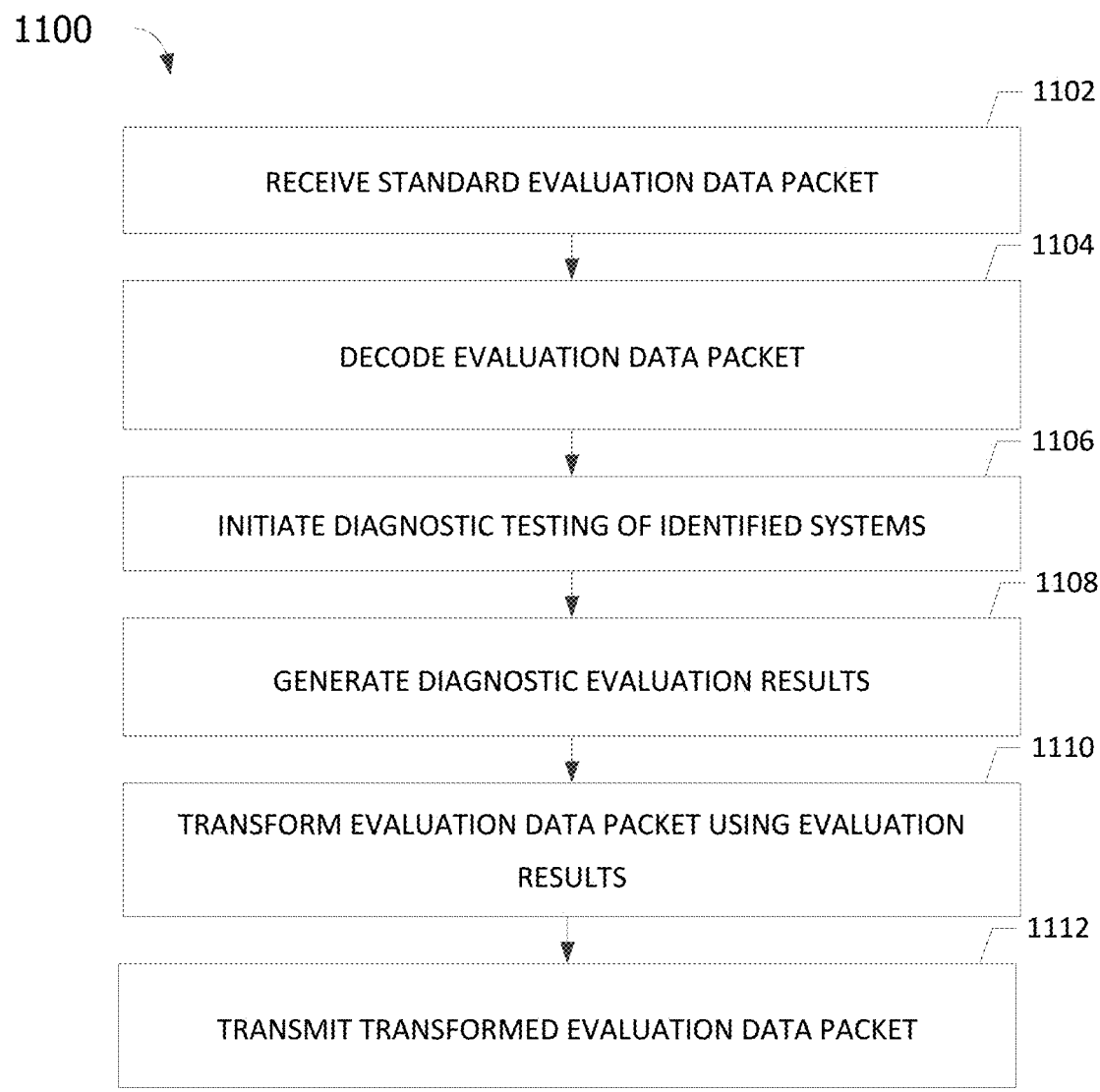
FIG. 11 illustrates a flow chart of an exemplary process for analyzing the communications performance of the vehicle shown in FIG. 1.

FIG. 11 illustrates a flow chart of an exemplary process for analyzing the communications performance of the vehicle 102 shown in FIG. 1, in accordance with one aspect of the present disclosure. In the exemplary embodiment, process 1100 is performed by a computer device associated with vehicle 102, such as vehicle controller 400 shown in FIG. 4. Vehicle controller 400 receives 1102, via transmitter assembly 410 (shown in FIG. 4), standard EDP 302 (shown in FIG. 3). Vehicle controller 400 decodes 1104 EDP 302 to determine a type of diagnostic, test, and/or evaluation to conduct. Decoding 1104 EDP 302 may include unpacking (e.g., decompressing) simulation test data. Simulation test data may, for example, include scenarios such as simulating multiple vehicles and/or obstacles in a generated virtual environment to identify response times for vehicle 102.

Vehicle controller 400 may initiate 1106 diagnostic testing of systems identified for testing in EDP 302. Initiating 1106 may include storing decoded EDP 302 instructions in a memory area 604 (shown in FIG. 6). Vehicle controller 400 may generate procedures (e.g., converting into machine instructions or bytecode) to perform diagnostic testing of identified sub-systems 404 and/or other components of vehicle 102. Vehicle controller 400 may then execute the generated procedures while measuring vehicle 102 response times and performance to generate 1108 diagnostic evaluation results. Evaluation result data may then be combined with EDP 302 in a transformation 1110 process to generate TEDP 502 (shown in FIG. 4) for transmission via transmitter assembly 410 (shown in FIG. 4). Vehicle controller 400 may then transmit 1112 TEDP 502 transmitter assembly 410 to a network communication device such as SDTL network device 206 and/or a remote server such as remote server 202 (both shown in FIG. 2).

Exemplary Computer Component System

Figure 12:
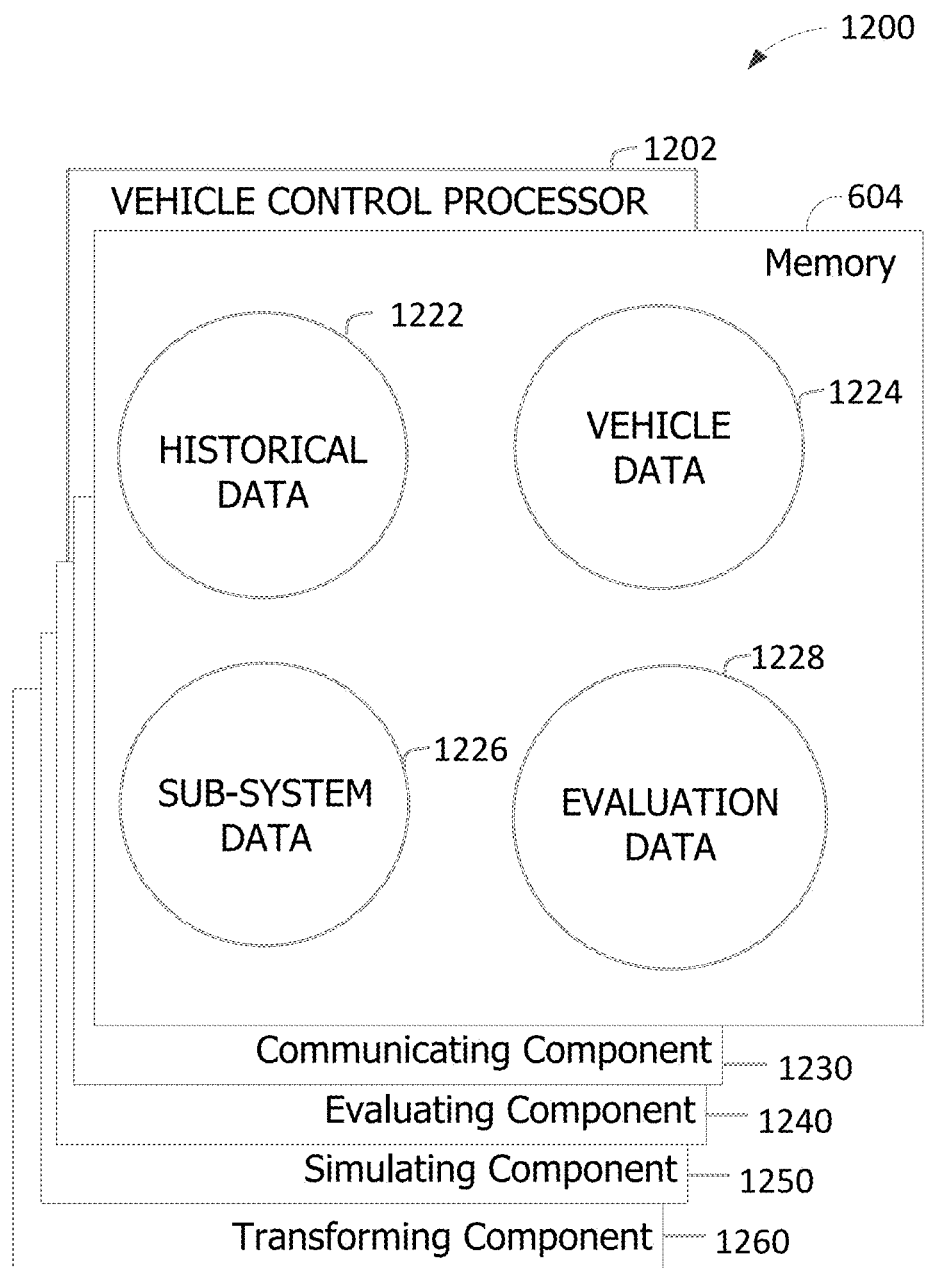
FIG. 12 depicts a diagram of components of one or more exemplary computing devices that may be used in the OVNCS shown in FIG. 4.

FIG. 12 depicts a diagram 1200 of components of one or more exemplary vehicle control processors 1202 that may be used in vehicle controller 400 shown in FIG. 4. In some embodiments, vehicle control processors 1202 may be similar to vehicle controller 402. Memory area 604 may be coupled with several separate components within vehicle control processors 1202, which perform specific tasks. In this embodiment, memory area 604 may include the historical data 1222, vehicle data 1224, sub-system data 1226, and evaluation data 1228. In some embodiments, historical data 1222 is similar to historical data 802, vehicle data 1224 is similar to vehicle data 806, and evaluation data 1228 is similar to test data 808 (all shown in FIG. 8).

Vehicle control processor 1202 may include a communication component 1230 for receiving 1102 EDP 302 and transmitting 1112 TEDP 502 (shown in FIG. 11, FIG. 3, and FIG. 5 respectively). Vehicle control processor 1202 may further include a evaluating component 1240 for initiating 1106 diagnostic testing and generating 1108 diagnostic evaluation results (shown in FIG. 11). Moreover, vehicle control processor 1202 may further include a simulating component 1250 for simulating different potential scenarios that vehicle 102 (shown in FIG. 1) may encounter such as environmental obstacles and traffic patterns. A transforming component 1260 may convert EDP 302 into TEDP 502 based upon the output of the evaluating component 1240 and/or simulating component 1250.

Exemplary Embodiments & Functionality

In one aspect, a computer system for evaluating the data transmission capabilities of an autonomous vehicle is provided. The vehicle may have a vehicle controller including at least one processor in communication with at least one memory device. The at least one processor may be programmed to receive, from a standard data transmission location network device, an evaluation data packet. The at least one processor may be programmed to decode the evaluation data packet and initiate a diagnostic test of the vehicle based upon the decoded evaluation data packet. The at least one processor may also be programmed to record measurements of the vehicle during the diagnostic test. The at least one processor may also be programmed to transmit the measurements to the standard data transmission location network device.

A further enhancement may be where the vehicle includes a communication system and wherein the evaluation data packet includes computer-executable instructions to test the communication system of the vehicle, and the at least one processor is further programmed to initiate a diagnostic test of the communication systems of the vehicle.

A further enhancement may be where the diagnostic test of the communication system includes activating the communication system, and wherein the processor is further programmed to record measurements of the communication system during activation of the communication system.

A further enhancement may be where the diagnostic test of the communication system includes activating the communication system, and wherein the processor is further programmed to record measurements of the communication system during activation of the communication system.

Another enhancement may be where recording the measurements of the communication system during activation of the communication system includes measuring a time period between initiation of the diagnostic test and completion of the diagnostic test.

A further enhancement may be where the vehicle includes a plurality of sub-systems for operating the vehicle, and wherein the diagnostic test includes performing an evaluation of at least one sub-system of the plurality of sub-systems.

In yet another enhancement, the processor may be programmed to transform the evaluation data packet into a transformed evaluation data packet based upon the evaluation data packet and the measurements.

In another enhancement, the diagnostic test may be a simulation of at least one event that requires at least one action initiated by the onboard vehicle navigation and control system that causes the vehicle to respond to the at least one event.

A further enhancement may be where the diagnostic test includes a simulation of at least one event that requires at least one action initiated by the vehicle controller that causes the vehicle to respond to the at least one event.

In another enhancement, transmitting the measurements, including diagnostic test results of the vehicle and a time value for completing the diagnostic test, to the standard data transmission location network device where the standard data transmission location network device is configured to transmit the measurements to a central server. The central server may be configured to calculate a risk level for the vehicle based on the measurements and transmit the risk level to an insurance provider for adjustment of insurance coverage based on the risk level.

In yet another enhancement, transmitting the measurements to the standard data transmission location network device causes the standard data transmission location network device to transmit the measurements to a central server. The central server may be configured to determine if the measurements exceed a threshold and transmit instructions to the vehicle to alter operation of the vehicle.

In another enhancement, transmitting the measurements to the standard data transmission location network device causes the standard data transmission location network device to calculate a risk level for the vehicle and transmit the risk level to an insurance provider.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical evaluation data, and/or vehicle performance data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the vehicle, user, route, sub-systems, and/or communication network from vehicle data, insurance policies, geolocation data, image data, network data, and/or other data.

Based upon these analyses, the processing element may learn how to identify characteristics and patterns that may then be applied to analyzing image data, model data, and/or other data. For example, the processing element may learn, with the user's permission or affirmative consent, to identify the type of incident that occurred based upon images of the resulting damage. The processing element may also learn how to identify damage that may not be readily visible based upon the received image data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for evaluating data transmission capabilities of an autonomous vehicle, the vehicle having a plurality of sub-systems for operating the vehicle and a vehicle controller, the vehicle controller including at least one processor in communication with at least one memory device, the at least one processor programmed to:
   embark the vehicle upon a trip defined by a route;
   receive, subsequent to embarking upon the trip, wirelessly from a standard data transmission location network device located along the route, an evaluation data packet containing instructions for at least one of the plurality of sub-systems;
   decode the evaluation data packet to identify the at least one sub-system and the instructions, wherein the instructions include computer-executable code for a simulation model;
   determine a type of diagnostic test to conduct on the vehicle based on the decoded evaluation data packet;
   initiate, while traveling along the route, the type of diagnostic test based on the instructions, including (i) activating the identified at least one sub-system and (ii) executing the simulation model, wherein the executed simulation model causes the at least one processor to simulate a situation that triggers the at least one sub-system to perform an action;
   in response to the simulated situation, transmit an operating command to the at least one sub-system;
   measure a response time required by the at least one sub-system to complete execution of the operating command;
   transmit the measured response time to the standard data transmission location network device, wherein transmitting the measured response time to the standard data transmission location network device causes the standard data transmission location network device to transmit the measured response time to a central server, wherein the central server is configured to determine if the measured response time exceeds a threshold, and transmit further instructions to the vehicle to alter operation of the vehicle; and
   record measurements of a communication system of the vehicle during activation of the communication system, wherein recording the measurements includes measuring a time period between initiation of the type of diagnostic test and completion of the type of diagnostic test.

2. The computer system of claim 1, wherein the evaluation data packet includes computer instructions to test the communication system of the vehicle, and the at least one processor is further programmed to initiate a further diagnostic test of the communication system of the vehicle.

3. The computer system of claim 2, wherein the further diagnostic test of the communication system includes activating the communication system.

4. The computer system of claim 1, wherein the at least one processor is further programmed to transform the evaluation data packet into a transformed evaluation data packet based upon the evaluation data packet and the measurements.

5. The computer system of claim 1, wherein the simulation model further causes the at least one processor to simulate the situation as an obstacle, wherein the obstacle is one of a virtual pedestrian and a virtual other vehicle.

6. The computer system of claim 1, wherein the standard data transmission location network device is configured to transmit the measured response time to the central server, wherein the central server is configured to:
   calculate a risk level for the vehicle based upon the measurements; and
   transmit the risk level to an insurance provider for adjustment of insurance coverage based upon the risk level.

7. The computer system of claim 1, wherein transmitting the measured response time to the standard data transmission location network device causes the standard data transmission location network device to calculate a risk level for the vehicle and transmit the risk level to an insurance provider.

8. A computer-implemented method for evaluating data transmission capabilities of an autonomous vehicle having a plurality of sub-systems for operating the vehicle and a vehicle controller, the method implemented by the vehicle controller including at least one processor in communication with at least one memory device, the method comprising:
   embarking the vehicle upon a trip defined by a route;
   receiving, subsequent to embarking upon the trip, wirelessly from a standard data transmission location network device located along the route, an evaluation data packet containing instructions for at least one of the plurality of sub-systems;
   decoding the evaluation data packet to identify the at least one sub-system and the instructions, wherein the instructions include computer-executable code for a simulation model;
   determining a type of diagnostic test to conduct on the vehicle based on the decoded evaluation data packet;
   initiating, while traveling along the route, the type of diagnostic test based on the instructions, including (i) activating the identified at least one sub-system and (ii) executing the simulation model, wherein the executed simulation model causes the at least one processor to simulate a situation that triggers the at least one sub-system to perform an action;
   in response to the simulated situation, transmitting an operating command to the at least one sub-system;
   measuring a response time required by the at least one sub-system to complete execution of the operating command;
   transmitting the measured response time to the standard data transmission location network device, wherein transmitting the measured response time to the standard data transmission location network device causes the standard data transmission location network device to transmit the measured response time to a central server, wherein the central server is configured to determine if the measured response time exceeds a threshold, and transmit further instructions to the vehicle to alter operation of the vehicle; and recording measurements of a communication system of the vehicle during activation of the communication system, wherein recording the measurements includes measuring a time period between initiation of the type of diagnostic test and completion of the type of diagnostic test.

9. The computer-implemented method of claim 8, wherein the evaluation data packet includes computer instructions to test the communication system of the vehicle, the method further comprises initiating a further diagnostic test of the communication system of the vehicle.

10. The computer-implemented method of claim 9, wherein the further diagnostic test of the communication system includes activating the communication system.

11. The computer-implemented method of claim 8 further comprising transforming the evaluation data packet into a transformed evaluation data packet based upon the evaluation data packet and the measured response time.

12. The computer-implemented method of claim 8, wherein the simulation model further causes the at least one processor to simulate the situation as an obstacle, wherein the obstacle is one of a virtual pedestrian and a virtual other vehicle.

13. One or more non-transitory computer-readable storage media having computer-executable instructions embodied thereon for use with an autonomous vehicle having a plurality of sub-systems for operating the autonomous vehicle and a vehicle controller, wherein when executed by at least one processor of the vehicle controller in communication with at least one memory device, the computer-executable instructions cause the at least one processor to:

embark the vehicle upon a trip defined by a route;

receive, subsequent to embarking upon the trip, wirelessly from a standard data transmission location network device located along the route, an evaluation data packet containing instructions for at least one of the plurality of sub-systems;

decode the evaluation data packet to identify the at least one sub-system and the instructions, wherein the instructions include computer-executable code for a simulation model;

determine a type of diagnostic test to conduct on the vehicle based on the decoded evaluation data packet;

initiate, while traveling along the route, the type of diagnostic test based on the instructions, including (i) activating the identified at least one sub-system and (ii) executing the simulation model, wherein the executed simulation model causes the at least one processor to simulate a situation that triggers the at least one sub-system to perform an action;

in response to the simulated situation, transmit an operating command to the at least one sub-system based on the instructions;

measure a response time required by the at least one sub-system to complete execution of the operating command;

transmit the measured response time to the standard data transmission location network device, wherein transmitting the measured response time to the standard data transmission location network device causes the standard data transmission location network device to transmit the measured response time to a central server, wherein the central server is configured to determine if the measured response time exceeds a threshold, and transmit further instructions to the vehicle to alter operation of the vehicle; and record measurements of a communication system of the vehicle during activation of the communication system, wherein recording the measurements includes measuring a time period between initiation of the type of diagnostic test and completion of the type of diagnostic test.

14. The computer-readable storage media of claim 13, wherein the evaluation data packet includes computer instructions to test the communication system of the vehicle and wherein the computer-executable instructions further cause the at least one processor to initiate a further diagnostic test of the communication system of the vehicle.

15. The computer-readable storage media of claim 14, wherein the further diagnostic test of the communication system includes activating the communication system.

* * * * *